United States Patent
Shearer et al.

(10) Patent No.: US 7,222,580 B2
(45) Date of Patent: May 29, 2007

(54) ENCLOSURE INCORPORATING ADJUSTABLE RELEASABLE FASTENER

(75) Inventors: Robert R. Shearer, Bradenton, FL (US); Pat Madden, Melbourne, FL (US)

(73) Assignee: Taylor Made Group, Inc., Gloversville, NY (US)

( * ) Notice: Subject to any disclaimer, the term of this patent is extended or adjusted under 35 U.S.C. 154(b) by 25 days.

(21) Appl. No.: 10/973,982

(22) Filed: Oct. 27, 2004

(65) Prior Publication Data

US 2005/0199174 A1 Sep. 15, 2005

Related U.S. Application Data

(60) Provisional application No. 60/514,015, filed on Oct. 27, 2003.

(51) Int. Cl.
*B63B 17/02* (2006.01)

(52) U.S. Cl. ..................... 114/361; 150/166

(58) Field of Classification Search .......... 24/300–302; 114/361; 150/166
See application file for complete search history.

(56) References Cited

U.S. PATENT DOCUMENTS

| | | | |
|---|---|---|---|
| 3,169,899 A * | 2/1965 | Steuber ..................... 428/198 |
| 4,019,212 A | 4/1977 | Downer | |
| 4,075,723 A | 2/1978 | Bareis et al. | |
| 4,363,284 A | 12/1982 | Monroe | |
| 5,058,946 A | 10/1991 | Faber | |
| 5,215,032 A | 6/1993 | Ellis et al. | |
| 5,339,763 A | 8/1994 | Erskine | |
| 5,367,977 A | 11/1994 | Ellis et al. | |
| 5,483,915 A * | 1/1996 | Clark ..................... 114/361 |
| 5,564,358 A | 10/1996 | Newton | |
| 5,706,753 A | 1/1998 | Menne et al. | |
| 5,743,208 A | 4/1998 | Miller | |
| 5,809,929 A | 9/1998 | Garnes | |
| 5,944,039 A | 8/1999 | Bergeron | |
| 5,970,904 A | 10/1999 | Wellen et al. | |
| 6,453,841 B1 | 9/2002 | Shearer et al. | |
| 6,595,155 B1 * | 7/2003 | Akers ..................... 114/361 |
| 6,623,322 B1 * | 9/2003 | Lesniak ..................... 441/38 |
| 6,659,035 B2 | 12/2003 | Treytiak | |
| 6,672,241 B2 | 1/2004 | Warfel et al. | |
| 6,789,495 B2 | 9/2004 | Brower et al. | |
| 6,820,569 B2 | 11/2004 | Warfel et al. | |

* cited by examiner

*Primary Examiner*—Ed Swinehart
(74) *Attorney, Agent, or Firm*—Nixon & Vanderhye P.C.

(57) ABSTRACT

An enclosure is removably securable to a support member including a first part of a releasable fastener. The enclosure includes a panel of material sized to enclose the support member. A flexible flap is affixed to the panel, and a second part of the releasable fastener is affixed to the flexible flap. The second part of the releasable fastener is positioned for engagement with the first part when the panel encloses the support member. By affixing the second part of the releasable fastener to the flexible flap, the position of the fastener is adjustable to accommodate panel shrinkage, manufacturing tolerances and the like.

7 Claims, 2 Drawing Sheets

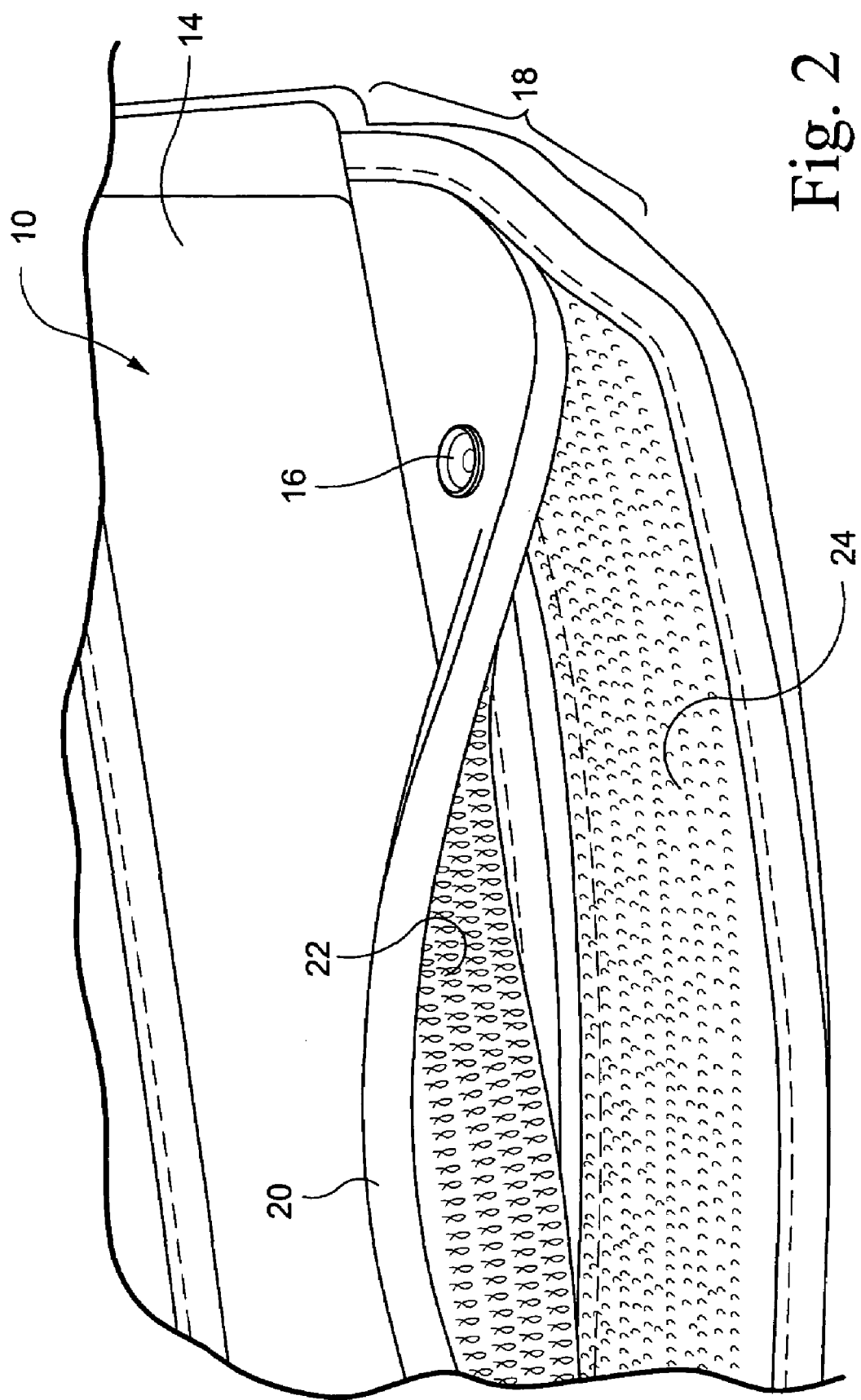

ENCLOSURE INCORPORATING ADJUSTABLE RELEASABLE FASTENER

CROSS-REFERENCES TO RELATED APPLICATIONS

This application claims the benefit of U.S. Provisional Patent Application Ser. No. 60/514,015, filed Oct. 27, 2003, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The present invention relates to a structural enclosure such as a boat cover and, more particularly, to an enclosure incorporating an adjustable releasable fastener.

Typically, a boat cover or other structural enclosure is provided with a snap component or other releasable fastener that is removably securable to a corresponding releasable fastener affixed to the boat or the like. Other suitable fasteners in use for this purpose include twist lock fasteners, "lift-the-dot" fasteners, "pull-the-dot" fasteners and the like. Each of these fastener types uses the same basic style of securing a female fastener on the fabric enclosure to a male stud on the boat. Typically, the snap component or other fastener is set with a press through the fabric to match up with the stud affixed to the boat.

A drawback of these methods, however, is that there can be no adjustment to the fastener once it is set into the fabric. Canvas flaps and other enclosure materials are weather-sensitive and may be subject to shrinkage in certain climates, making flaps that fit, for example, in warm weather almost impossible to snap onto the boat when it becomes cold. The material may also shrink after exposure to the environment, such as rain, sun, etc. Another drawback with existing constructions is that the exterior fastener component is visible from the outside, which disturbs the clean appearance of the cover when installed.

BRIEF SUMMARY OF THE INVENTION

It is thus an object of the present invention to provide an enclosure that overcomes the drawbacks of conventional constructions. The invention utilizes a flexible flap affixed to the panel, which allows the user to set the fastener into an inside flap of material, which will then snap into the male fastener on the boat. If the location of the female snap needs to be adjusted, the flexible material can be stretched in any direction to accommodate the change. By securing the flap to an inside portion of the panel, the fasteners can be hidden from view.

In an exemplary embodiment of the invention, an enclosure is removably securable to a support member including a first part of a releasable fastener. The enclosure includes a panel of preferably canvas material sized to enclose the support member, a flexible flap affixed to the panel, and a second part of the releasable fastener affixed to the flexible flap and positioned for engagement with the first part of the releasable fastener when the panel encloses the support member. In one arrangement, the flexible flap overlays a portion of the panel. In this context, a first side of the flexible flap facing the panel portion may include one part of a hook and loop material, and the panel portion may include the other part of the hook and loop material. Moreover, the second part of the releasable fastener may be affixed to a second side of the flexible flap, opposite from the first side. Preferably, the flexible flap comprises a neoprene material.

In one arrangement, the releasable fastener is a snap, wherein the first part is one of a male snap component or a female snap component, and wherein the second part is the other of the male snap component or the female snap component. The flap is preferably affixed by sewing.

The support member may be at least a portion of a boat, in which the first part of the releasable fastener is affixed to the boat.

In another exemplary embodiment of the invention, a boat cover includes a panel of material for covering a boat and an attachment member affixed to the panel and removably engageable with one part of a releasable fastener secured to the boat. The attachment member is adjustable to accommodate panel shrinkage and manufacturing tolerances.

In still another exemplary embodiment of the invention, an enclosure removably securable to a support member includes a panel of preferably canvas material sized to enclose the support member, where the panel has an attachment section adjacent a bottom perimeter. A flexible flap is affixed to and overlaying the attachment section of the panel. A second part of the releasable fastener is affixed to the flexible flap and is positioned for engagement with the first part of the releasable fastener when the panel encloses the support member.

BRIEF DESCRIPTION OF THE DRAWINGS

These and other aspects and advantages of the present invention will be described in detail with reference to the accompanying drawings, in which:

FIG. 2 illustrates the construction of the enclosure attachment section.

DETAILED DESCRIPTION OF THE INVENTION

Figure 1:
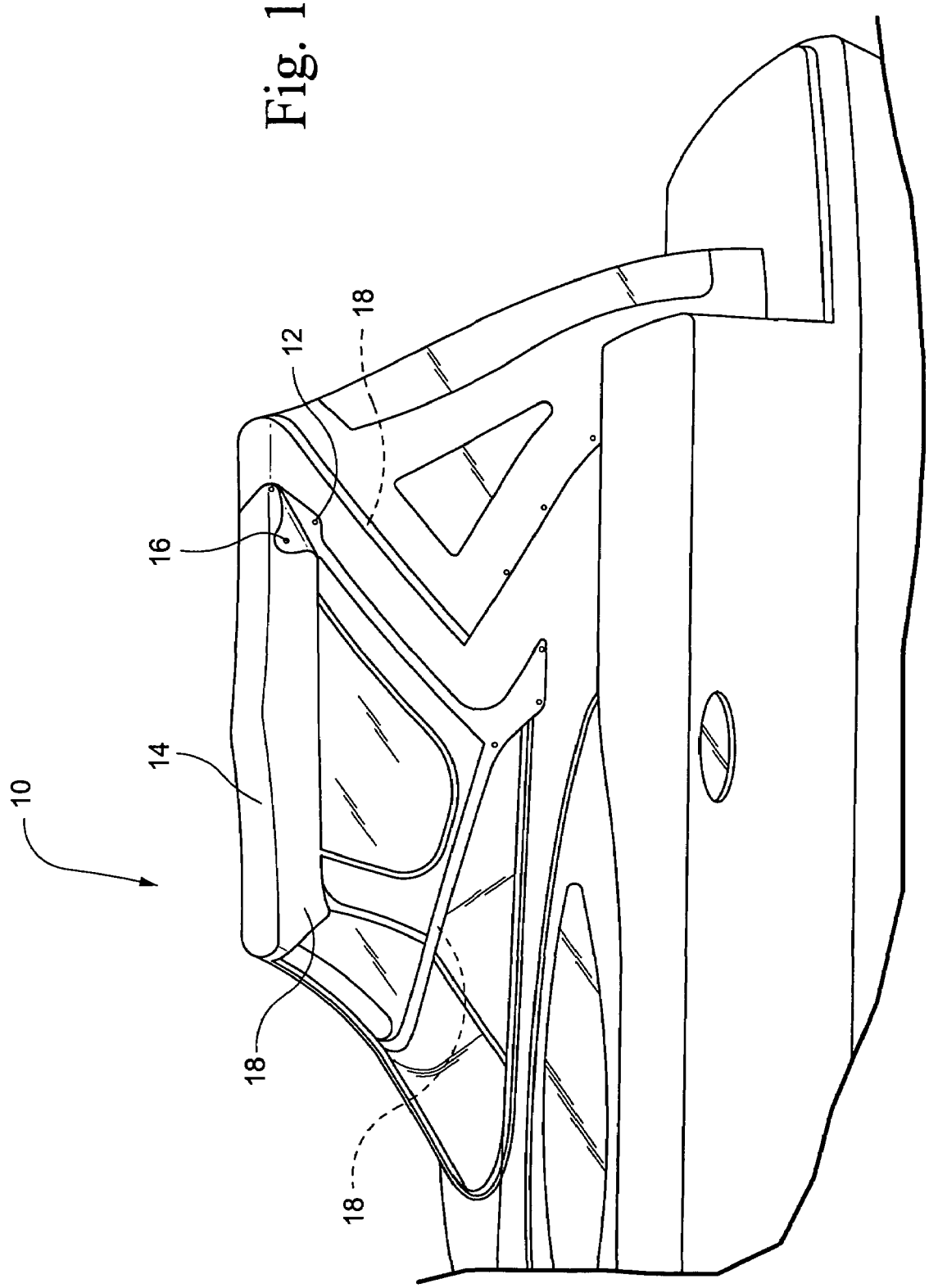
FIG. 1 is a perspective view of a boat including the enclosure of the present invention.

FIG. 1 is a perspective view of a boat including the enclosure 10 of the present invention. Although the enclosure 10 is described in conjunction with its implementation as a boat cover, those of ordinary skill in the art will appreciate that the enclosure may be suited for many different applications, and the invention is not meant to be limited to a boat cover. Additionally, the enclosure concept is equally applicable to the side or rear panels attached to the boat hull, deck or arch as shown in FIG. 1 (see the dashed-line references in FIG. 1).

With reference to FIG. 1, a boat hull or windshield frame has affixed thereto a plurality of releasable fastener components 12, such as a male post of a snap fastener. A cover or enclosure 10 is comprised of a panel 14 of preferably canvas material that is suitably sized for the intended purpose and a plurality of corresponding releasable fastener components 16 removably engageable with the releasable fastener components 12 affixed to the boat. Other materials may be suitable for the enclosure as would be apparent to those of ordinary skill in the art. In an exemplary embodiment, the releasable fastener component 16 of the enclosure 10 is a female post of a snap fastener, and the releasable fastener component 12 of the boat is a corresponding male post. Of course, the male and female components of the snap fastener may be reversed or alternative releasable fasteners may be used.

FIG. 2 illustrates details of the cover attaching components. As is conventional, the enclosure 10 is provided with an attachment section 18, which may be integrated with the panel 14 or affixed via sewing, dielectric welding, heat welding, or the like. The enclosure 10 includes the panel of preferably canvas material 14 sized to enclose the boat or other support member. A flexible flap 20 is affixed to via sewing, dielectric welding, heat welding or the like and overlays the attachment section 18 of the panel 14. The flexible flap 20 is preferably formed of an elastic material such as neoprene. A backing (not shown) may be added to the webbing where the snap is set into the neoprene to keep the snap from pulling through the neoprene. The second part 16 of the releasable fastener is affixed to the flexible flap 20 in a conventional manner. The second part 16 of the releasable fastener is positioned for engagement with the first part 12 when the panel 14 encloses the boat or other support member.

A first side 22 of the flexible flap 20 facing the attachment section 18 of the panel 14 preferably includes one part of a hook and loop material. The facing portion 24 of the panel 14 is provided with the other part of the hook and loop material. In this manner, with the second part 16 of the releasable fastener affixed to the first part 12 of the releasable fastener, the attachment section 18 of the panel 14 is secured over the releasable fastener via the hook and loop material components 22, 24, thereby hiding the releasable fastener from view when installed.

In use, with the second part 16 of the releasable fastener affixed to the flexible neoprene flap 20, a position of the second part 16 can be easily adjusted to accommodate panel shrinkage, manufacturing tolerances and the like. Moreover, since the fasteners are hidden from view via the attachment section 18 of the panel 14, the outer appearance of the enclosure has a cleaner look.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An enclosure removably securable to a support member including a first part of a releasable fastener, the enclosure comprising:
   a panel of material sized to enclose the support member;
   a flexible flap affixed to the panel; and
   a second part of the releasable fastener affixed to the flexible flap and positioned for engagement with the first part of the releasable fastener when the panel encloses the support member,
   wherein the flexible flap overlays a portion of the panel, wherein a first side of the flexible flap facing the panel portion comprises one part of a hook and loop material, wherein the panel portion comprises the other part of the hook and loop material, wherein the second part of the releasable fastener is affixed to a second side of the flexible flap, opposite from the first side, and wherein the flexible flap comprises a neoprene material.

2. An enclosure according to claim 1, wherein the releasable fastener comprises a snap, wherein the first part is one of a male snap component or a female snap component, and wherein the second part is the other of the male snap component or the female snap component.

3. An enclosure according to claim 1, wherein the flexible flap is affixed by sewing.

4. An enclosure according to claim 1, wherein the support member is at least a portion of a boat, and wherein the first part of the releasable fastener is affixed to a hull of the boat.

5. An enclosure removably securable to a support member including a first part of a releasable fastener, the enclosure comprising:
   a panel of material sized to enclose the support member, the panel having an attachment section adjacent a bottom perimeter;
   a flexible flap affixed to and overlaying the attachment section of the panel; and
   a second part of the releasable fastener affixed to the flexible flap and positioned for engagement with the first part of the releasable fastener when the panel encloses the support member,
   wherein a first side of the flexible flap facing the attachment section comprises one part of a hook and loop material, wherein the attachment section comprises the other part of the hook and loop material, wherein the second part of the releasable fastener is affixed to a second side of the flexible flap, opposite from the first side, and wherein the flexible flap comprises a neoprene material.

6. An enclosure according to claim 5, wherein the releasable fastener comprises a snap, wherein the first part is one of a male snap component or a female snap component, and wherein the second part is the other of the male snap component or the female snap component.

7. An enclosure according to claim 5, wherein the support member is at least a portion of a boat, and wherein the first part of the releasable fastener is affixed to the boat.

* * * * *